United States Patent

[11] 3,632,131

[72] Inventor Ortwin Engfer
Gerlingen, Germany
[21] Appl. No. 53,110
[22] Filed July 8, 1970
[45] Patented Jan. 4, 1972
[73] Assignee Robert Bosch GmbH
Stuttgart, Germany
[32] Priority July 22, 1969
[33] Germany
[31] P 19 37 163.2

[54] BODY LEVELLING ARRANGEMENT FOR A CAR
10 Claims, 7 Drawing Figs.
[52] U.S. Cl. .................................................. 280/124 F
[51] Int. Cl. .................................................. B60g 17/04
[50] Field of Search .................................. 280/124 F

[56] References Cited
UNITED STATES PATENTS
3,087,743  4/1963  Behles ........................... 280/124 F
3,064,995  11/1962  Weller ........................... 280/124 F

*Primary Examiner*—Philip Goodman
*Attorney*—Michael S. Striker

ABSTRACT: When the front end of the body of a car is at a lower or higher level than the rear end due to an uneven load, the rear end is lowered, or raised, respectively, by a pneumatic adjusting motor to the level of the front end. Front and rear sensing means sense the displacements of the front and rear ends of the body relative to the front and rear shafts, and control level regulator means which operate pressure control means for discharging air from the pneumatic adjusting motor when lowering of the rear end is required, and supply air under pressure to the pneumatic adjusting motor when raising of the rear end is required.

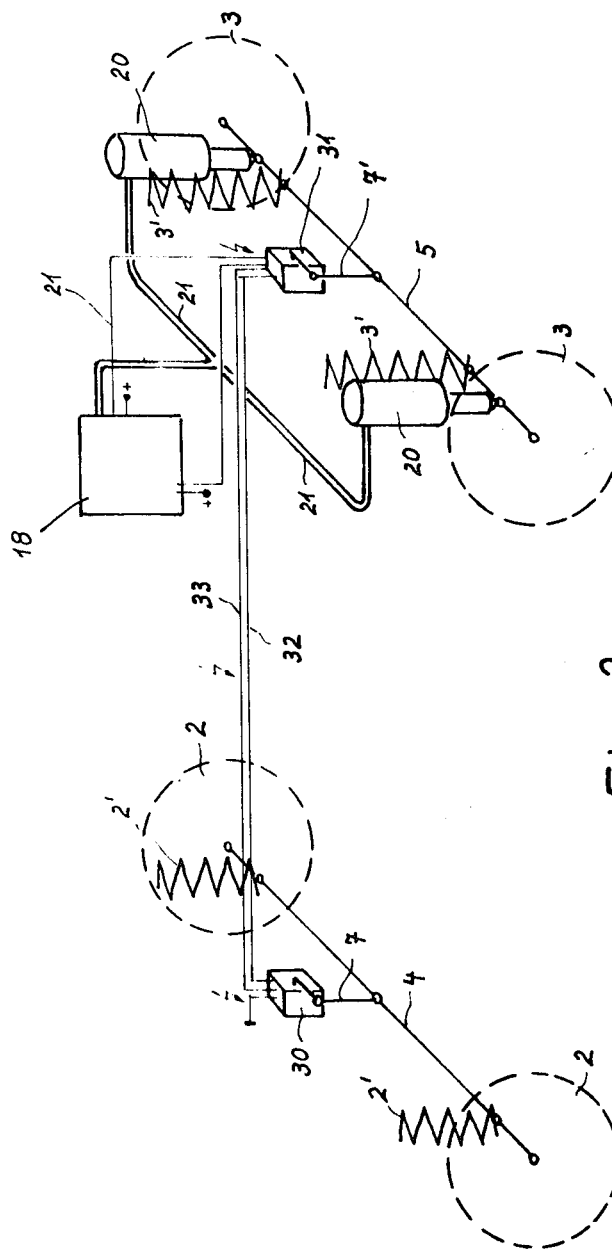

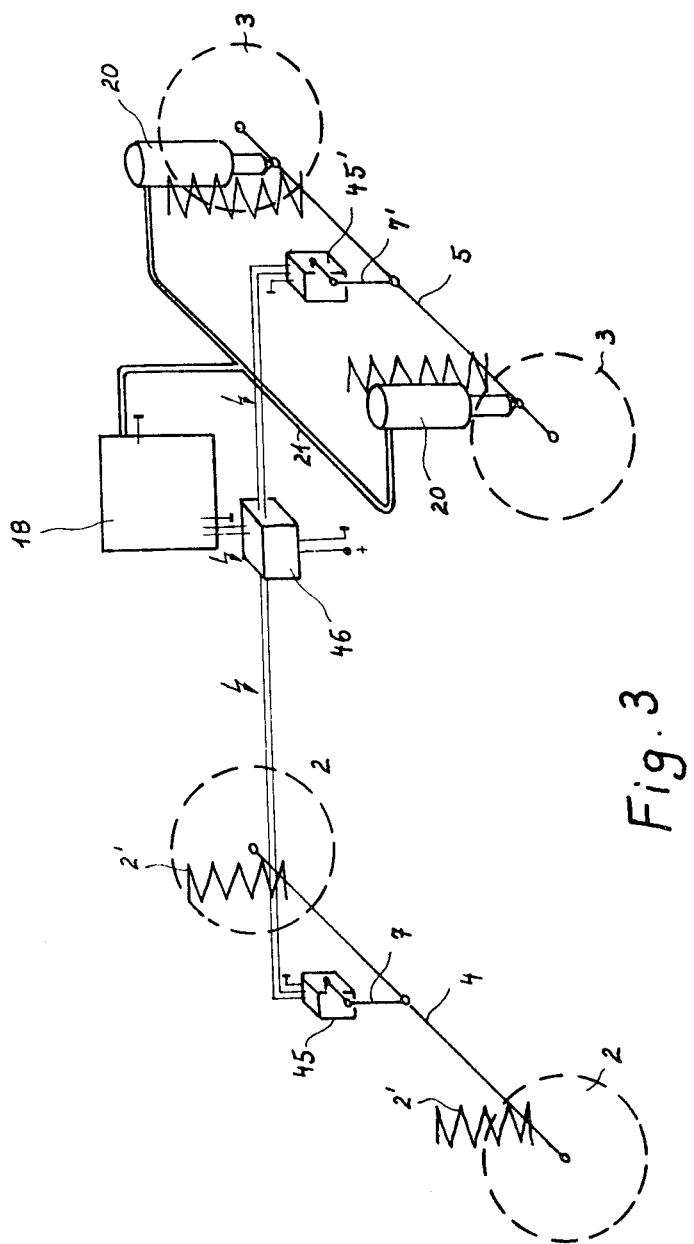

3,632,131

BODY LEVELLING ARRANGEMENT FOR A CAR

BACKGROUND OF THE INVENTION

The present invention is concerned with a levelling arrangement for the body of a vehicle, particularly an automotive vehicle.

It is possible to adjust the level of the body of the car, by independent level regulating means provided in the region of the front and the rear shafts of the car. Such an arrangement is comparatively expensive. It is also possible to regulate only the level of the rear end of the body in relation to the rear shaft, in which event the rear end of the body is kept at a constant level, but since the load also acts on the front end of the body, the same is displaced relative to the rear end of the body, and the body assumes a slanted position since the rear end is maintained at a constant level, and the front end sinks toward the front shaft. This has the disadvantage that the headlights are angularly displaced, and the beam is projected in a wrong direction toward the road surface.

SUMMARY OF THE INVENTION

It is one object of the invention to overcome the disadvantages of the prior art, and to provide a car with a body levelling device which maintains the body of the car independently of the load distribution, in a plane parallel to the road surface and to a plane passing through the axes of the front and rear shafts.

Another object of the invention is to maintain the body of the car in a position parallel to the road surface, while regulating only the position of one end of the body.

Another object of the invention is to provide a levelling arrangement which causes the rear end of the body of the car to move down to the level of the front end, if the latter is lower, and to move up to the level of the front end if the level is higher than the rear end of the body.

With these objects in view, the present invention provides one end of the body and the corresponding shaft with an adjusting means which is operated to raise or lower the respective end in accordance with signals representing the level of the other body end in the region of the other shaft.

The body levelling arrangement of the invention is applied to a vehicle having front and rear shafts, a body, and spring means movable mounting the front and rear ends of the body on the front and rear shaft, respectively. One embodiment of the invention comprises fluid-operated resilient adjusting means, preferably a pair of pneumatic servo motors between the rear shaft and the rear end of the body; fluid pressure control means having a first condition for discharging pressure fluid from the adjusting means so that the rear end is lowered, and a second condition for supplying pressure fluid to the adjusting means so that the rear end is raised; front and rear sensing means, preferably including a linkage connecting the body with the respective shaft, and sensing the extent of relative displacement between the front end and the front shaft, and between the rear end and the rear shaft, respectively, caused by a load on the body; and level regulator means controlled by the front and rear sensing means and being connected with the fluid pressure control means and controlling the same.

The fluid pressure control means are placed in the first and second condition, respectively, when the sensing means at the front end of the body senses a level of the rear end of the body lower and higher, respectively, than the level of the front end of the body. In this manner, the rear end of the body in lowered and raised, respectively, by the adjusting means until the front and rear sensing means sense that the front and rear ends of the body are at the same level, irrespective of the load distribution on the body.

The novel features which are considered as characteristic for the invention are set forth in particular in the appended claims. The invention itself, however, both as to its construction and its method of operation, together with additional advantages and objects thereof, will be best understood from the following description of specific embodiments when read in connection with the accompanying drawing.

BRIEF DESCRIPTION OF THE DRAWING

FIG. 2 is a fragmentary schematic perspective view illustrating a second embodiment of the invention;

FIG. 3 is a fragmentary schematic perspective view illustrating a third embodiment of the invention;

DESCRIPTION OF THE PREFERRED EMBODIMENTS

Figure 1:
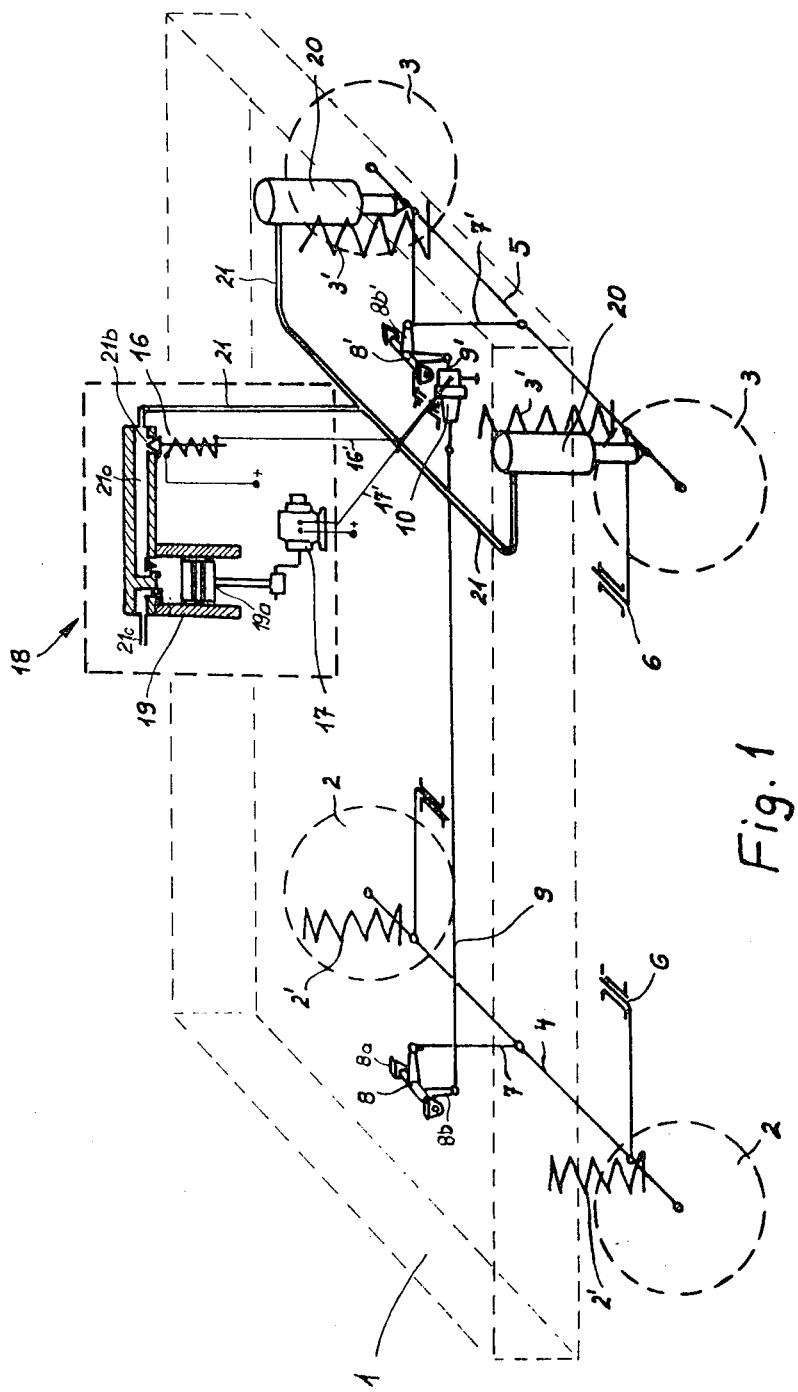
FIG. 1 is a fragmentary schematic perspective view illustrating a first embodiment of the invention, and including a schematic sectional view illustrating a detail of the embodiment of FIG. 1 on an enlarged scale.

Corresponding parts of the embodiments of the invention are indicated by like reference numerals in the drawing.

A vehicle has a body 1 which is supported by steel springs 2' and 3' on front and rear shafts 4, 5 supporting pairs of wheels 2 and 3. Shafts 4 and 5 are supported by lever means 6 in a well-known manner which is not an object of the invention. It is evident that, when a load is placed on the body 1, a uniformly distributed load will compress springs 2' and 3' so that the body remains parallel to a plane passing through the axes of the shafts 4 and 5 while a greater load on the front end of the body 1 will cause compression of springs 2' and a lower level of the front end than the level of the rear end which is not pressed down so far by the load. On the other hand, if a greater load is placed on the rear end of body 1, the same compresses spring 3' to a greater extent than springs 2' are compressed by the front end of body 1.

Between the rear end of body 1, and the rear shaft 5, two fluid-operated resilient adjusting means in the form of pneumatic cylinder-and-piston motors 20 are provided, so that supply of air through conduit means 21 will cause expansion of the adjusting motors 20 and raising of the rear end of body 1, while discharge of air through conduit means 21 from the cylinders of the pneumatic adjusting motor 20 will cause the rear end of body 1 to sink toward the rear shaft 5. Fluid pressure control means 18 are mounted on body 1, and shown within the angle 18 on a large scale. The fluid pressure control means 18 includes a conduit means 21a communicating at one end with conduit 21, and having at the other end an inlet 21c for fluid, such as air. A compressor 19 has a piston 19a reciprocated by an electric motor 17 so that air from inlet 21c passes through a pair of check valves into conduit means 21a and is pressed through conduit 21 into the cylinders of the pneumatic cylinder-and-piston motors 20 when motor 17 rotates. Conduit means 21a has a discharge outlet normally closed by an electromagnetic valve 16 whose winding is connected with the positive terminal of a voltage source, and with a conductor 16' which is connected with a level regulator means 10, shown on an enlarged scale and in detail in FIG. 1a. Electric motor 17 is also connected to the positive terminal of the voltage source, and to a conductor 17' leading to the level regulator means 10.

Figure 1A:
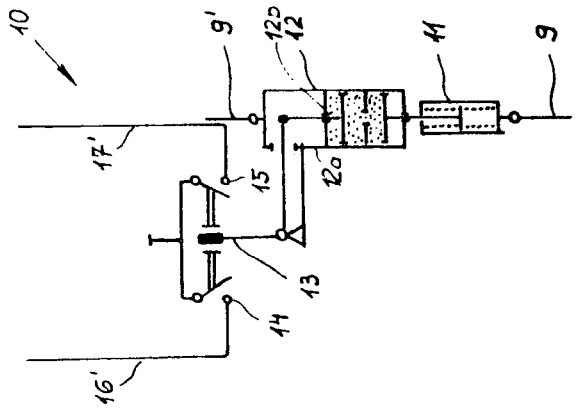
FIG. 1a is a schematic and diagrammatic view illustrating the level regulator of the embodiment of FIG. 1 on an enlarged scale.

Front and rear sensing means 8 and 8' are provided which include brackets 8a on which an angular lever 8b is mounted for angular movement. Links 7 and 7' connect the angular levers with the rear shafts 4 and 5, while the brackets are secured to the underside of the body 1. Linking rods 9 and 9' are respectively secured to the other arms of the angular levers 8b, and 8b', respectively, and projects into the level regulator means 10 shown schematically in FIG. 1 and in greater detail in FIG. 1a. Referring now to FIG. 1a, the linking rods 9 and 9' are connected by mechanical damping means 11 including coil springs, and by hydraulic damping means 12 in which a fluid passes along a tortuous path. Displacements of linking rods 9 and 9' due to relative movement between the front and rear ends of body 1, and the front and rear shafts, respectively, are dampened by the damping means 11 and 12. An angular lever 13 is mounted for pivotal movement on a support carried by cylinder 12a of damping means 12, and one arm of lever 13 is pivotally connected with the piston rod of damping piston 12b. Consequently, displacement of either linking rod 9 or of linking rod 9' will cause angular displacement of lever 13 in one or the other direction of rotation so that actuator lever 13 operates one or the other of two switches 14 and 15 which are, respectively, provided in conductors 16' and 17' which respectively lead to the electromagnetic valve 16 and to the electromotor 17, as shown in FIG. 1. Depending on the relative position of linking rods 9, either electric motor 17 will operate so that pressure air is supplied to the adjusting motors 20 for raising the rear end of body 1, or electromagnetic valve 16 is actuated, and air discharged from the cylinders of adjusting motors 20 through conduit 21 and outlet opening 21b so that the rear end of body 1 is lowered toward the rear shaft side.

Front sensing means 8, 8a, 7 and 9, and rear sensing means 8, 8a, 8b', 7' and 9' respond to a displacement of the respective end of body 1 since angular lever 8b, 8b' turns, and longitudinally displaces the respective linking rod 9 or 9'.

The embodiment of FIGS. 1 and 1a operates as follows:

When the body is in a neutral position under a uniformly distributed load, and parallel to the front and rear shafts 4 and 5, which may also occur during up and down movement of the entire car body with expansion and contraction of springs 2' and 3', the level regulating means 10 remain in the neutral position in which actuator lever 13 operates none of the switches 14 and 15. Conduit means 21 are closed, and the pneumatic adjusting motors 20 are not operated. Due to the fact that the cylinders of the pneumatic adjusting motors 20 are filled with air, the rear end of body 1 is resiliently supported by adjusting motors 20 and by springs 3'.

If the greater load is placed on the front end of body 1, the same is lowered, and since bracket 8a moves toward shaft 4 and link 7, angular lever 8b turns and displaces linking rod 9 so that actuating lever 13 in the level regulator means 10 is turned and closes switch 14 so that current flows through conductor 18' and through the winding of the electromagnetic valve 16 whereby discharge opening 21b is opened, and air is discharged from the cylinders of the adjusting means 20 through conduit 21 so that the rear end of body 1 sinks downwards toward rear shaft 5 until the level at the rear end is the same as the level at the front end of body 1. Actuating lever 13 again assumes its neutral position shown in FIG. 1a so that the electromagnetic valve 16 closes the discharge opening 21b.

In the event that a previous load is reduced only at the front end 1, springs 2' urge the front end upwards so that the sensing means 8, 8a, 8b retracts linking rod 9 so that actuating lever 13 turns in clockwise direction and operates switch 15 whereby motor 17 and compressor 19 are started, and air under pressure is supplied through conduit 21 to the adjusting means 20 which raise the rear end of the body to the level of the front end of the body until the entire body is again in neutral position, and actuating lever 13 moves back to its neutral position.

It will be understood that instead of the linking rods 9, 9', other linking means, such as a hydraulic linkage can be used for displacing actuator lever 13 of the level regulator means 10.

In the embodiment of FIGS. 2-5, the level regulator means are not mechanically, but electrically, controlled from the sensing means.

Figure 2A:
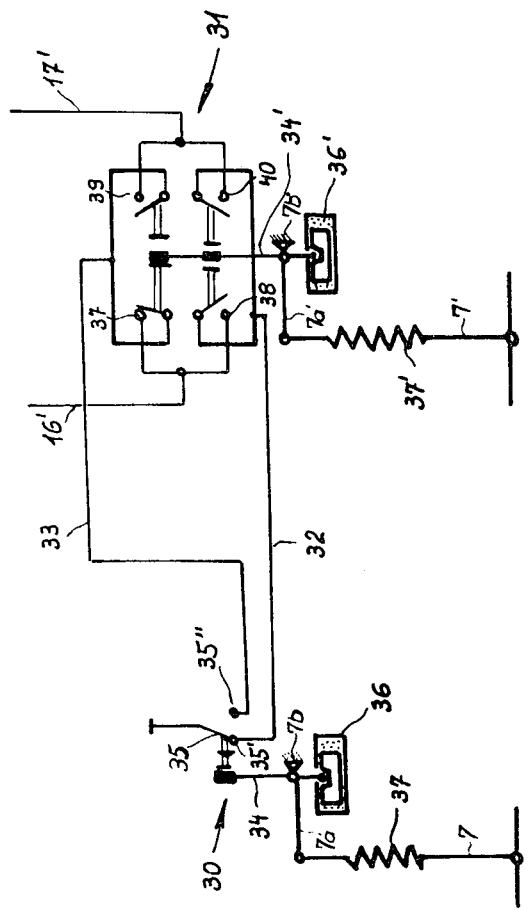
FIG. 2a is a schematic and diagrammatic view illustrating a detail of the embodiment of FIG. 1 on an enlarged scale.

Referring now to FIGS. 2 and 2a, the front and rear sensing means include links 7, 7' connected with the front and rear shafts 4, 5, and level regulator means 30 and 31. As best seen in FIG. 2a, springs 37 and 37' form part of the links 7 and 7', which are articulated with levers 7a and 7a' pivotally mounted on schematically shown supports 7b and 7b' secured to the underside of body 1. Switch actuators 34 and 34' are respectively secured to levers 7a and 7a'. Hydraulic damping means 36 and 36' are provided for the actuators 34 and 34'. A switch 35 is shifted by actuator 34 of the sensing linkage 7, 7a between two positions engaging contacts 35' and 35" which respectively are connected by conductors 32 and 33 with pairs of switches 38, 40 and 37, 39. Actuator 34' is dampened by hydraulic damping means 36' and is angularly movable between positions closing switches 37, 38, 39 and 40. The pair of switches 37, 39 is slightly displaced in relation to the pair of switches 38 and 40. Switches 37, 38 control conductor 16' which leads to the electromagnetic valve 16 described with reference to FIG. 1, while switches 39 and 40 are provided in conductor 17' which leads to the electric motor 17 driving compressor 19. Due to the fact that the level regulator means 31, 32 operates in two steps, it is necessary that at a low load on body 1, contact 35' and conductor 32 must be connected to ground, while at the greater load, contact 35" and conductor 33 are connected to ground. Due to this arrangement, the level regulator means 31 can raise or lower the rear end of the body when the level is varied by loading or unloading.

When lowering is required, the switches 37 and 38 are active, while when raising is required, the switches 39 and 40 are active. Since the pairs of contacts 37, 39 and 38, 40 are staggered to each other, as shown in FIG. 2a, the pair of contacts 37, 39 regulates a lower level of the rear end over the rear shaft. Consequently, the body is lower at full load on the rear end, so that the entire body is again parallel to the road surface when fully loaded. Due to the regulation in two steps, the maximal slant of body 1 is reduced by 50 percent.

Assuming that a higher load was placed on the front end of body 1, sensing means 7, 7a is displaced with actuator 34 which shifts switch 35 to the contact 35" so that a current flows through switch 37 and conductor 16' for opening discharge opening 12b by electromagnetic valve 16 whereby the pressure in the pneumatic adjusting means 20 is reduced, and the rear end of the body is permitted to sink until it is at the same level as the load-depressed front end, and the actuator 34' is displaced to open switch 37 again so that the electromagnetic valve 16 is disconnected. When the rear end is overloaded, actuator 34' sequentially operates switches 40 and 39 so that motor 17 operates compressor 13, and adjusting means 20 again raise the rear end of the car to the level of the front end.

Figure 4:
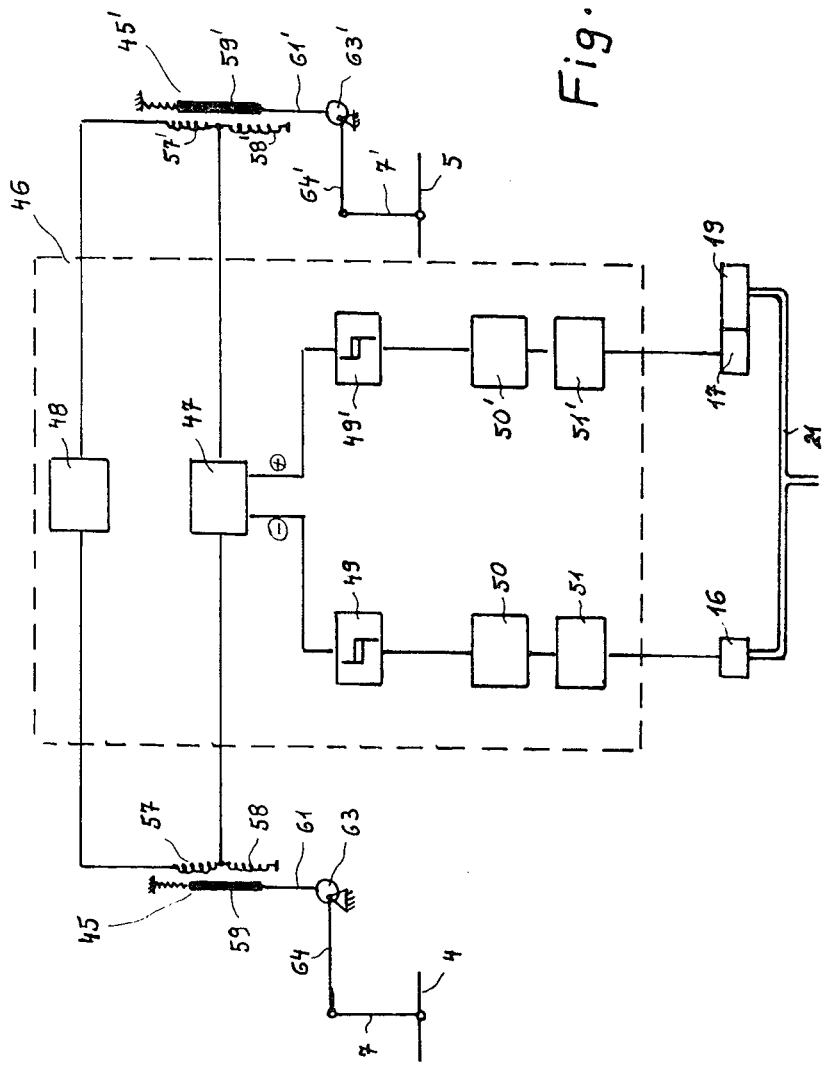
FIG. 4 is a schematic and diagrammatic view illustrating a detail of the embodiment of FIG. 3 on an enlarged scale.
Figure 5:
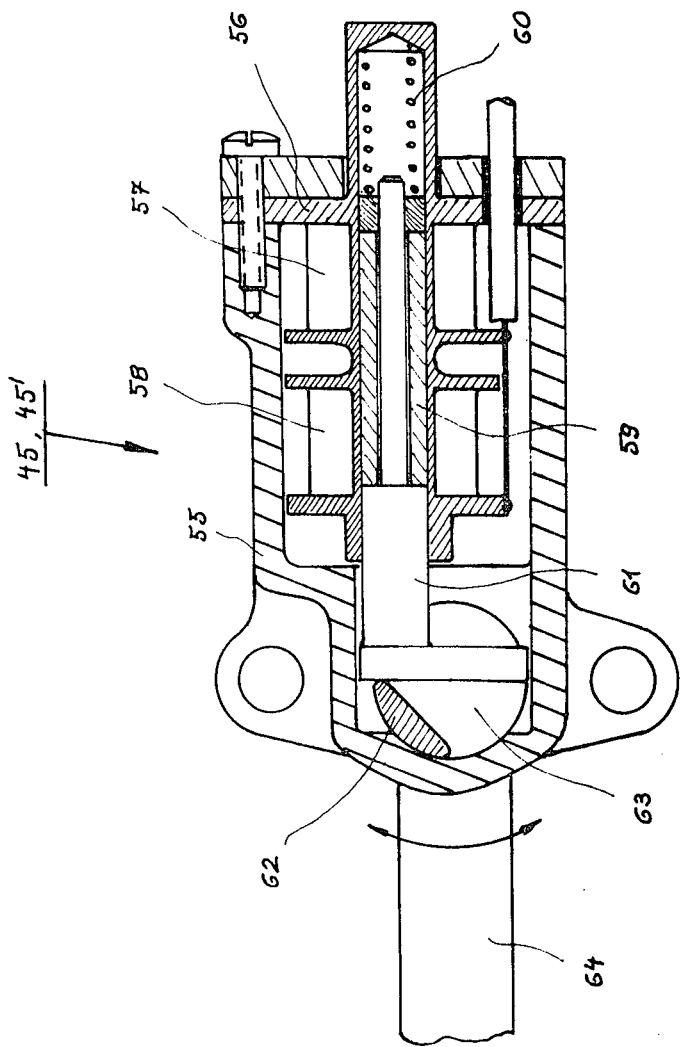
FIG. 5 is a sectional view illustrating a detail of the embodiment of FIG. 3 on an enlarged scale.

FIGS. 3-5 illustrate an embodiment in which the sensed displacements of the front and rear end are represented by electric pulses which are compared by electronic means. Front and rear transmitter means 45, 45' are connected with the level regulator means 46, and these parts of the apparatus are shown in greater detail in FIG. 4. A pulse generator 48 transmits pulses to inductive winding means 57, 58 and 57', 58' of the transmitter means 45 and 45'. The centers of the winding means 57, 58 and 57', 58' are connected to an electronic adder 47. A core 59 or 59', preferably made of ferrit is displaced by the sensing linkage 7, 64, or 7', 64' in accordance with the level variations of the front and rear ends of body 1. In this manner, the pulses received from pulse generator 48 can be influenced in the front and rear transmitters 45, 45' to represent the displacement of the respective end of the body.

A practical construction of a transmitter means 45 or 45' is shown in FIG. 5. A nonmagnetic housing 55, which may consist of plastic or aluminum, supports a carrier 56 on which the two winding portions 57, 58 are mounted. The ferrit core 59 is axially movable within winding carrier 56 against the action of spring 60. The free end of core 59 has an end portion 61 cooperating with the lug 62 eccentrically mounted on a shaft 63 which can be turned from the outside by a leer 64 which is part of the sensing linkage 64, 7. Consequently, when the respective end of the car body is lowered, or raised, the arm 64 is turned with shaft 63 and lug 62 so that core 59 is displaced relative to the winding portion 57, 58 so that the pulses received from pulse generator 48 are modified in accordance with the displacement of the front end of the body relative to the front shaft 4. The pulse transmitter 45' operates in the same manner and is controlled by the sensing linkage 7', 64' which turns shaft 63' and moves core 59' through rod 61 relative to winding portions 57' and 58'.

The adder 47 which receives the modified pulses transmitted from transmitter means 45 and 45' forms the difference between the two pulse sequences, which is either positive or negative, as indicated in FIG. 4. A pair of Schmitt triggers 49, 49', a pair of delay elements 50, 50', and a pair of amplifiers 51, 51' are respectively connected with the magnetic valve 16, see FIG. 1, and with the electric motor 17 driving compressor 19, see FIG. 1, for controlling the flow in conduit 21 to the pneumatic adjusting means 20.

The embodiment of FIGS. 3–5 operates as follows:

The pulse generator 48 operates at approximately 10 kiloHertz. Depending on the position of the ferrit cores 59, 59', particular pulses are supplied to the adder 47. If the values are equal, indicating the same level of the front and rear ends, the output of the adder 47 is zero, and no operation is necessary. If the adder produces a negative result, this value is supplied to the Schmitt trigger 49 and after a certain amount of displacement is indicated by the negative difference, the Schmitt trigger 49 becomes conductive and transmits the respective pulse to the delay element 50, which transmits the pulse, if the displacement lasts a predetermined time, to the amplifier 51 whose current controls the electromagnetic valve 16 to effect lowering of the rear end of the body by the pneumatic adjusting means 20 until the rear end is at the same level as the front end.

If a positive result appears at the output of the adder, Schmitt trigger 49', delay element 50', and amplifier 51' become operative to start electric motor 17 and compressor 19 so that the rear end of the body is raised by the pneumatic adjusting means 20 receiving pressure air through conduit 21.

The housings 35 of the level regulators 45 and 45' are secured to body 1. Since each sensing linkage 7, 64 and 7', 64' is connected with a shaft, relative movements between the front and rear ends and the front and rear shafts cause angular displacement of lever 64 with shaft 63, and displacement of core 59 for representing the amount of displacement of the respective end of body 1 towards or away from the respective shaft.

It will be understood that each of the elements described above, or two or more together, may also find a useful application in other types of levelling apparatus for the body of a car differing from the types described above.

While the invention has been illustrated and described as embodied in a levelling apparatus in which the level of the rear end of the body is automatically adjusted to be equal to any displaced level of the front end caused by an uneven load, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. In a vehicle having front and rear shafts, a body, and spring means movably mounting the front and rear ends of said body on said front and rear shafts, respectively, a body-levelling arrangement comprising fluid-operated resilient adjusting means between one of said shafts and the respective one body end; fluid pressure control means having a first condition for discharging pressure fluid from said adjusting means so that one body end is lowered, and a second condition for supply pressure fluid to said adjusting means so that said one body end is raised; front and rear sensing means for sensing the extent of relative displacements between said front end and said front shaft, and between said rear end and said rear shaft, respectively, caused by a load on said body; and level regulator means controlled by said front and rear sensing means and being connected with said fluid pressure control means for placing the same in said first and second condition, respectively, when the sensing means at said other body end senses a level of the respective other body end lower and higher, respectively, than the level of said one body end sensed by the sensing means at said one body end whereby said one body end is lowered and raised, respectively, by said adjusting means until said front and rear sensing means sense that said front and rear body ends are at the same level, irrespective of the load distribution on said body.

2. Levelling arrangement as claimed in claim 1, wherein said one body end is the rear end, and said other body end is the front end of said body; and wherein said fluid operated adjusting means is disposed between said rear end and said rear shaft.

3. Levelling arrangement as claimed in claim 1, wherein said adjusting means includes pneumatic piston and cylinder means; wherein said fluid pressure control means includes conduit means communicating with said piston and cylinder means, a compressor for pressing air into said conduit means, an electric motor for driving said compressor, a discharge valve in said conduit means, and electromagnetic means for opening said discharge valve; and wherein said level regulator means includes first and second switches for energizing said electromagnetic means and said electric motor, respectively, and means for operating said switches under the control of said front and rear sensing means.

4. Levelling arrangement as claimed in claim 1, wherein said level regulator means includes first and second switches operable for placing said fluid pressure control means in said first and second conditions, respectively, and actuating means for operating said switches under the control of said front and rear sensing means responding to different levels of said body ends.

5. Levelling arrangement as claimed in claim 1, wherein each of said front and rear sensing means includes a linkage between said body and the respective shaft, and a motion-transmitting linking means connected with said linkage and being displaced by the same upon level changes of the respective body end; and wherein said linking means of said front and rear sensing means extend to said level regulator means for controlling the same.

6. Levelling arrangement as claimed in claim 1, wherein each of said sensing means includes a linkage connected between the respective body end and the respective shaft and being displaced upon a level change of the respective body end, and an actuator moving with the respective linkage; and wherein said level regulator means includes front and rear switch means operated by said first and second actuators, and circuit means connecting said front and rear switch means with each other and with said fluid pressure control means for placing the same in said first and second conditions when at least one of said linkages is displaced and said body ends are disposed at different levels.

7. Levelling arrangement as claimed in claim 6, wherein said one body end is the rear end, and the other body end is the front end of said body; wherein said fluid operated adjusting means is located between said rear end and said rear shaft; wherein said front switch means includes a front switch shiftable by the actuator of said front sensing means between two positions corresponding to different levels of said front end; and wherein said rear switch means includes a plurality of rear switches sequentially shiftable by the actuator of said rear sensing means between positions corresponding to different levels of said rear end.

8. Levelling apparatus as claimed in claim 1, wherein each of said sensing means includes a linkage connected between the respective body end and the respective shaft and being displaced upon a level change of the respective body end, an actuator moving with the respective linkage, and front and rear transmitter means operated by the respective actuators to transmit front and rear pulses representing displacements of said front and rear ends relative to said front and rear shafts, respectively; wherein said level regulator means receive said front and rear pulses and include electronic means for comparing the same and for producing first and second output signals, respectively, when the difference between said front and rear pulses indicates a higher or lower level of one of said ends; and wherein said fluid pressure control means receives said first and second output signals and is placed by the same in said first and second conditions, respectively.

9. Levelling apparatus as claimed in claim 8, comprising a pulse generator; wherein said front and rear transmitter means each include winding means receiving pulses from said pulse generator, and a movable core mounted on the respective actuator and transforming said pulses of said generator into said displacement-representing front and rear pulses; wherein said electronic means includes an adder so that said first and second output signals, respectively, represent a positive or negative difference between said front and rear pulses, Schmitt triggers for positive and negative output signals, respectively, and delay elements in series with said Schmitt triggers, respectively; and wherein said pressure fluid control means include two means for placing the same in said first and second conditions, respectively, and being respectively connected with said delay elements for receiving negative and positive output signals, respectively.

10. Levelling arrangement as claimed in claim 1, wherein said one body end is the rear end, and said other body end is the front end of said body; wherein said fluid operated adjusting means is disposed between said rear end and said rear shaft; wherein said adjusting means includes pneumatic piston and cylinder means; wherein said fluid pressure control means includes conduit means communicating with said piston and cylinder means, a compressor for pressing air into said conduit means, an electric motor for driving said compressor means, a discharge valve in said conduit means, and electromagnetic means for opening said discharge valve; wherein said level regulator means includes first and second switches for energizing said electromagnetic means and said electric motor, respectively; wherein each of said sensing means includes a linkage connected between the respective body end and the respective shaft and being displaced upon a level change of the respective body end, and an actuator moving with the respective linkage; and wherein said first and second switches are operated by said actuators of said front and rear sensing means.

* * * * *